(12) United States Patent
Keyzer et al.

(10) Patent No.: US 11,769,911 B2
(45) Date of Patent: Sep. 26, 2023

(54) METHODS FOR MAKING MAGNESIUM SALTS

(71) Applicant: Dyson Technology Limited, Wiltshire (GB)

(72) Inventors: Evan Keyzer, Cambridge (GB); Clare Grey, Cambridge (GB); Dominic Wright, Newmarket (GB)

(73) Assignee: Dyson Technology Limited, Malmesbury (GB)

( * ) Notice: Subject to any disclaimer, the term of this patent is extended or adjusted under 35 U.S.C. 154(b) by 384 days.

(21) Appl. No.: 16/647,468

(22) PCT Filed: Sep. 7, 2018

(86) PCT No.: PCT/GB2018/052537
§ 371 (c)(1),
(2) Date: Mar. 13, 2020

(87) PCT Pub. No.: WO2019/053400
PCT Pub. Date: Mar. 21, 2019

(65) Prior Publication Data
US 2020/0220221 A1  Jul. 9, 2020

(30) Foreign Application Priority Data

Sep. 14, 2017 (GB) .................... 1714770

(51) Int. Cl.
*C01B 6/24* (2006.01)
*C07F 5/06* (2006.01)
(Continued)

(52) U.S. Cl.
CPC .......... *H01M 10/0568* (2013.01); *C01B 6/24* (2013.01); *C01B 6/243* (2013.01); *C07F 5/069* (2013.01);
(Continued)

(58) Field of Classification Search
CPC ........................................ C01B 6/04
See application file for complete search history.

(56) References Cited

U.S. PATENT DOCUMENTS 3,761,500 A  9/1973 Thomas
3,993,508 A  11/1976 Erlichman
(Continued)

FOREIGN PATENT DOCUMENTS

CA  2527207 A1  12/2004
CN  1404635 A  3/2003
(Continued)

OTHER PUBLICATIONS

Birrozzi et al. (2016). "Beneficial effect of propane sultone and tris(trimethylsilyl) borate as electrolyte additives on the cycling stability of the lithium rich nickel manganese cobalt (NMC) oxide," Journal of Power Sources 325:525-533.
(Continued)

*Primary Examiner* — Imran Akram
(74) *Attorney, Agent, or Firm* — Faegre Drinker Biddle & Reath LLP

(57) ABSTRACT

A method of making a salt of the formula: $Mg[Al(R)_4]_2$, where R represents a compound selected from a deprotonated alcohol or thiol; an amine; or a mixture thereof. The method comprising the steps of; combining a $Mg(AlH_4)_2$ precursor with an alcohol, thiol or amine of the general formula R—H to create a reaction liquor containing $Mg[Al(R)_4]_2$; and washing the reaction liquor in an organic solvent.

5 Claims, 7 Drawing Sheets

(51) Int. Cl.
  *H01M 10/0568* (2010.01)
  *H01M 10/0567* (2010.01)
  *H01M 10/054* (2010.01)

(52) U.S. Cl.
  CPC ..... *H01M 10/054* (2013.01); *H01M 10/0567* (2013.01); *H01M 2300/0025* (2013.01)

(56) References Cited

U.S. PATENT DOCUMENTS

| | | | |
|---|---|---|---|
| 4,047,289 A | 9/1977 | Wolff | |
| 4,288,381 A | 9/1981 | Dozzi et al. | |
| 4,299,986 A * | 11/1981 | Cucinella | C07C 1/26 568/8 |
| 5,136,046 A * | 8/1992 | Park | C07F 5/069 548/402 |
| 5,250,784 A | 10/1993 | Muller et al. | |
| 5,411,592 A | 5/1995 | Ovshinsky et al. | |
| 5,670,652 A | 9/1997 | Drauz et al. | |
| 5,718,989 A | 2/1998 | Aoki et al. | |
| 6,616,714 B1 | 9/2003 | Gauthier et al. | |
| 7,754,384 B2 | 7/2010 | Patoux et al. | |
| 8,153,301 B2 | 4/2012 | Jiang | |
| 8,546,018 B2 | 10/2013 | Kajiyama | |
| 8,722,250 B2 | 5/2014 | Park et al. | |
| 9,293,766 B2 | 3/2016 | Liu et al. | |
| 9,325,030 B2 | 4/2016 | Zidan | |
| 9,525,173 B2 | 12/2016 | Kagei et al. | |
| 9,575,025 B2 | 2/2017 | Nakayama et al. | |
| 9,593,024 B2 | 3/2017 | Thackeray et al. | |
| 9,692,084 B2 | 6/2017 | Yang et al. | |
| 9,755,272 B2 | 9/2017 | Gaben | |
| 9,768,450 B2 | 9/2017 | Song et al. | |
| 9,843,041 B2 | 12/2017 | Lopez | |
| 9,893,376 B2 | 2/2018 | Yang et al. | |
| 9,947,916 B2 | 4/2018 | Oda | |
| 9,960,458 B2 | 5/2018 | Weicker et al. | |
| 9,997,774 B2 | 6/2018 | Hiratsuka | |
| 10,199,649 B2 | 2/2019 | Beck et al. | |
| 10,290,869 B2 | 5/2019 | Axelbaum | |
| 10,629,902 B2 | 4/2020 | Yu | |
| 11,616,229 B2 | 3/2023 | Roberts et al. | |
| 2002/0110733 A1 | 8/2002 | Johnson | |
| 2003/0022063 A1 | 1/2003 | Paulsen et al. | |
| 2003/0129495 A1 | 7/2003 | Yamato et al. | |
| 2003/0162086 A1 | 8/2003 | Longhi, Jr. et al. | |
| 2004/0091779 A1 | 5/2004 | Kang et al. | |
| 2005/0014065 A1 | 1/2005 | Jung et al. | |
| 2005/0112466 A1 | 5/2005 | Jordy et al. | |
| 2006/0160261 A1 | 7/2006 | Sheats | |
| 2007/0238019 A1 | 10/2007 | Laurent et al. | |
| 2008/0263855 A1 | 10/2008 | Li et al. | |
| 2008/0264478 A1 | 10/2008 | Ahn et al. | |
| 2009/0148764 A1 | 6/2009 | Kwak et al. | |
| 2009/0214904 A1 * | 8/2009 | Zhou | H01M 8/04156 429/421 |
| 2010/0090162 A1 * | 4/2010 | Mohtadi | B01J 20/04 252/182.32 |
| 2010/0108939 A1 | 5/2010 | Breger et al. | |
| 2010/0233542 A1 | 9/2010 | Endo et al. | |
| 2010/0248033 A1 | 9/2010 | Kumar et al. | |
| 2011/0126402 A1 | 6/2011 | Kwak et al. | |
| 2011/0129594 A1 | 6/2011 | Kwak et al. | |
| 2011/0168944 A1 | 7/2011 | Chang et al. | |
| 2011/0291043 A1 | 12/2011 | Wilcox et al. | |
| 2011/0294015 A1 | 12/2011 | Pirk et al. | |
| 2011/0311883 A1 | 12/2011 | Oukassi et al. | |
| 2012/0183855 A1 | 7/2012 | Wohlfahrt-Mehrens et al. | |
| 2012/0225199 A1 | 9/2012 | Muthu et al. | |
| 2012/0270114 A1 | 10/2012 | Reynolds et al. | |
| 2012/0312474 A1 | 12/2012 | Kwak et al. | |
| 2012/0321815 A1 | 12/2012 | Song et al. | |
| 2013/0040201 A1 | 2/2013 | Manthiram | |
| 2013/0160283 A1 | 6/2013 | Wu | |
| 2013/0260248 A1 | 10/2013 | Seki et al. | |
| 2013/0298387 A1 | 11/2013 | Kobier et al. | |
| 2014/0000100 A1 | 1/2014 | Oh et al. | |
| 2014/0007418 A1 | 1/2014 | Song et al. | |
| 2014/0120397 A1 | 5/2014 | Kim et al. | |
| 2014/0154555 A1 | 6/2014 | Endoh et al. | |
| 2014/0154581 A1 | 6/2014 | Kawasato et al. | |
| 2014/0178748 A1 | 6/2014 | Chernyshov et al. | |
| 2014/0227594 A1 | 8/2014 | Song et al. | |
| 2014/0227609 A1 | 8/2014 | Frey et al. | |
| 2014/0242463 A1 | 8/2014 | Song | |
| 2014/0255603 A1 | 9/2014 | Xiao et al. | |
| 2015/0010822 A1 | 1/2015 | Nakahara et al. | |
| 2015/0010872 A1 | 1/2015 | Schindler et al. | |
| 2015/0050522 A1 | 2/2015 | Manthiram et al. | |
| 2015/0064558 A1 | 3/2015 | Seki et al. | |
| 2015/0102530 A1 | 4/2015 | Wallace et al. | |
| 2015/0180031 A1 | 6/2015 | Thackeray et al. | |
| 2015/0188186 A1 | 7/2015 | Bedjaoui et al. | |
| 2015/0280201 A1 | 10/2015 | Bhardwaj | |
| 2016/0164088 A1 | 6/2016 | Peralta et al. | |
| 2016/0164092 A1 | 6/2016 | Stottlemyer | |
| 2016/0218362 A1 | 7/2016 | Kagei et al. | |
| 2016/0218364 A1 | 7/2016 | Sakai et al. | |
| 2016/0254539 A1 | 9/2016 | Kagei et al. | |
| 2016/0294010 A1 | 10/2016 | Herb et al. | |
| 2016/0372783 A1 | 12/2016 | Min et al. | |
| 2017/0133678 A1 | 5/2017 | Ozoemena et al. | |
| 2019/0044182 A1 | 2/2019 | Maeda et al. | |
| 2019/0115627 A1 | 4/2019 | Rendall | |
| 2019/0334171 A1 | 10/2019 | Ozoemena | |
| 2020/0280099 A1 | 9/2020 | Keyzer et al. | |
| 2020/0335786 A1 | 10/2020 | Roberts et al. | |
| 2020/0377376 A1 | 12/2020 | Roberts et al. | |
| 2020/0381718 A1 | 12/2020 | Roberts et al. | |
| 2020/0381724 A1 | 12/2020 | Roberts et al. | |
| 2020/0381725 A1 | 12/2020 | Roberts et al. | |
| 2020/0381726 A1 | 12/2020 | Roberts et al. | |

FOREIGN PATENT DOCUMENTS

| | | |
|---|---|---|
| CN | 1458706 | 11/2003 |
| CN | 1464573 | 12/2003 |
| CN | 1610154 A | 4/2005 |
| CN | 101128941 A | 2/2008 |
| CN | 101562245 A | 10/2009 |
| CN | 101694876 A | 4/2010 |
| CN | 101855770 A | 10/2010 |
| CN | 102054986 A | 5/2011 |
| CN | 102074700 A | 5/2011 |
| CN | 102881873 A | 1/2013 |
| CN | 103035900 A | 4/2013 |
| CN | 103066274 A | 4/2013 |
| CN | 103311513 A | 9/2013 |
| CN | 103545519 A | 1/2014 |
| CN | 103887562 A | 6/2014 |
| CN | 105047898 A | 11/2015 |
| CN | 105742607 A | 7/2016 |
| CN | 105810934 A | 7/2016 |
| CN | 103943844 B | 8/2016 |
| CN | 106410186 A | 2/2017 |
| CN | 106573795 A | 4/2017 |
| CN | 104241633 B | 9/2017 |
| DE | 4227720 A1 | 4/1993 |
| EP | 1189296 A2 | 3/2002 |
| EP | 2746288 A1 | 6/2014 |
| EP | 2763219 A2 | 8/2014 |
| EP | 2827430 A1 | 1/2015 |
| EP | 3093272 A1 | 11/2016 |
| GB | 1402544 A | 8/1975 |
| GB | 2128604 A | 5/1984 |
| JP | 45-035555 | 11/1970 |
| JP | 57-96472 A | 6/1982 |
| JP | S64-21870 A | 1/1989 |
| JP | H4-269721 A | 9/1992 |
| JP | 09-237631 A | 9/1997 |
| JP | 2000-149911 A | 5/2000 |
| JP | 2002-343342 A | 11/2002 |
| JP | 2003-226955 A | 8/2003 |
| JP | 2005-044801 A | 2/2005 |

(56) References Cited

FOREIGN PATENT DOCUMENTS

| | | | |
|---|---|---|---|
| JP | 2005-100947 A | 4/2005 | |
| JP | 2005-150093 A | 6/2005 | |
| JP | 2005-150102 A | 6/2005 | |
| JP | 2006-294597 A | 10/2006 | |
| JP | 2007-503102 A | 2/2007 | |
| JP | 2009-182273 A | 8/2009 | |
| JP | 2009-246236 A | 10/2009 | |
| JP | 2009-544141 A | 12/2009 | |
| JP | 2010-251075 A | 11/2010 | |
| JP | 2011-108603 A | 6/2011 | |
| JP | 2012-129166 A | 7/2012 | |
| JP | 2013-506945 A | 2/2013 | |
| JP | 2014-510372 A | 4/2014 | |
| JP | 2014-112476 A | 6/2014 | |
| JP | 2014-146458 A | 8/2014 | |
| JP | 2014-529176 A | 10/2014 | |
| JP | 2014-531718 A | 11/2014 | |
| JP | 2014-531719 A | 11/2014 | |
| JP | 2017-521848 A | 8/2017 | |
| KR | 10-2004-0096063 A | 11/2004 | |
| KR | 10-2014-0081468 A | 7/2014 | |
| KR | 10-2016-0091172 A | 8/2016 | |
| KR | 10-2017-0008540 A | 1/2017 | |
| KR | 10-2017-0025874 A | 3/2017 | |
| TW | 201145648 A | 12/2011 | |
| WO | 2006/027925 A2 | 3/2006 | |
| WO | 2006/071972 A2 | 7/2006 | |
| WO | 2009/055529 A1 | 4/2009 | |
| WO | 2010/036723 A1 | 4/2010 | |
| WO | 2011/039132 A1 | 4/2011 | |
| WO | 2011/052607 A1 | 5/2011 | |
| WO | 2012/065767 A1 | 5/2012 | |
| WO | 2013/021955 A1 | 2/2013 | |
| WO | 2013/035519 A1 | 3/2013 | |
| WO | 2013/118659 A1 | 8/2013 | |
| WO | 2013/146723 A1 | 10/2013 | |
| WO | 2015/007586 A1 | 1/2015 | |
| WO | 2015/053357 A1 | 4/2015 | |
| WO | 2015/107194 A1 | 7/2015 | |
| WO | 2016/001884 A1 | 1/2016 | |
| WO | 2016/210419 A1 | 12/2016 | |
| WO | 2017/047280 A1 | 3/2017 | |
| WO | 2017/087403 A1 | 5/2017 | |

OTHER PUBLICATIONS

Cucinella et al. (1982). "Calcium Alkoxyalanates I. Synthesis and Physicochemical Characterization," Journal of Organometallic Chemistry 224(1): 1-12.
Hudson et al. (2007). "Studies on Synthesis and Dehydrogenation Behavior of Magnesium Alanate and Magnesium-Sodium Alanate Mixture," International Journal of Hydrogen Energy 32(18): 4933-4938.
International Search Report and Written Opinion dated Dec. 19, 2018, directed to International Application No. PCT/GB2018/052537; 20 pages.
Mehrotra et al. (Jan. 1978). "Preparation and Characterization of Some Volatile Double Isopropoxides of Aluminium with Alkaline Earth Metals," Inorganica Chemica Acta 29:131-136.
Metz et al. (2002). "Weakly Coordinating Al-, Nb-, Ta-, Y-, and La-Based Perfluoroaryloxymetalate Anions as Cocatalyst Components for Single-Site Olefin Polymerization," Organometallics 21(18): 3691-3702.
Park et al. (Apr. 2004). "Structural investigation and electrochemical behaviour of Li[NixLi(1/3-2x/3)Mn(2/3-x/3)]O2 compounds by a simple combustion method," Journal of Power Sources 129: 288-295.
Park et al. (May 2010). "Suppression of O2 evolution from oxide cathode for lithium-ion batteries: VOx-impregnated 0.5Li2MnO3-0.5LiNi0.4Co0.2Mn0.4O2 cathode," Chemical Communications, 46(23): 4190-4192.
Search Report dated May 30, 2018, directed to GB Application No. 1714770.3; 2 pages.
Thackeray et al. (Aug. 2006). "Comments on the structural complexity of lithium-rich Li1+xM1-xO2 electrodes (M+Mn, Ni, Co) for lithium batteries," Electrochemistry Communications 8(9):1531-1538.
Turova et al. (1977). "Hydrolysis and Alcoholysis of Alkali Metal Aluminium Hydrides," Inorganica Chimica Acta, 21: 157-161.
Wu et al. (Mar. 2006). "High Capacity, Surface-Modified Layered Li[Li(1-x)/3Mn(2-x)/3Nix/3Cox/3]O2 Cathodes with Low Irreversible Capacity Loss," Electrochemical and Solid-State Letters 9(5): A221-A224.
Yasushi et al. (Nov. 16, 1984) "CAS No. [32843-22-4] Aluminate (1-), tetrakis(diphenylaminato)-, magnesium," (2 pages).
Govil et al., "Some Double Ethoxides of Alkaline Earth Metals with Aluminium", Synthesis and Reactivity in Inorganic and Metal-Organic Chemistry, vol. 5, No. 4, 1975, pp. 267-277.
International Preliminary Report on Patentability received for PCT Patent Application No. PCT/GB2018/052537, dated Mar. 26, 2020, 13 pages.
International Preliminary Report on Patentability received for PCT Patent Application No. PCT/GB2018/052538, dated Mar. 26, 2020, 8 pages.
International Preliminary Report on Patentability received for PCT Patent Application No. PCT/GB2018/053655, dated Jul. 2, 2020, 10 pages.
International Preliminary Report on Patentability received for PCT Patent Application No. PCT/GB2018/053656, dated Jul. 2, 2020, 8 pages.
International Preliminary Report on Patentability received for PCT Patent Application No. PCT/GB2018/053657, dated Jul. 2, 2020, 10 pages.
International Preliminary Report on Patentability received for PCT Patent Application No. PCT/GB2018/053659, dated Jul. 2, 2020, 11 pages.
International Preliminary Report on Patentability received for PCT Patent Application No. PCT/GB2018/053660, dated Jul. 2, 2020, 7 pages.
International Preliminary Report on Patentability received for PCT Patent Application No. PCT/GB2018/053663, dated Jul. 2, 2020, 7 pages.
International Search Report and Written Opinion received for PCT Patent Application No. PCT/GB2018/052538, dated Oct. 29, 2018, 11 pages.
International Search Report and Written Opinion received for PCT Patent Application No. PCT/GB2018/053655, dated Apr. 8, 2019, 15 pages.
International Search Report and Written Opinion received for PCT Patent Application No. PCT/GB2018/053656, dated Feb. 15, 2019, 11 pages.
International Search Report and Written Opinion received for PCT Patent Application No. PCT/GB2018/053657, dated Apr. 15, 2019, 14 pages.
International Search Report and Written Opinion received for PCT Patent Application No. PCT/GB2018/053659, dated Apr. 8, 2019, 16 pages.
International Search Report and Written Opinion received for PCT Patent Application No. PCT/GB2018/053660, dated Feb. 14, 2019, 9 pages.
International Search Report and Written Opinion received for PCT Patent Application No. PCT/GB2018/053663, dated Sep. 15, 2019, 10 pages.
Office Action received for Korean Patent Application No. 10-2020-7010108, dated Jul. 28, 2021, 10 pages (5 pages of English Translation and 5 pages of Original Document).
Office Action received for Korean Patent Application No. 10-2020-7010109, dated Jul. 28, 2021, 10 pages (5 pages of English Translation and 5 pages of Original Document).
Search Report dated Jun. 28, 2018, directed to GB Application 1721179.8; 2 pages.
Search Report dated Jun. 28, 2018, directed to GB Application No. 1721177.2; 2 pages.

(56) References Cited

OTHER PUBLICATIONS

Search Report dated Jun. 28, 2018, directed to GB Application No. 1721178.0; 2 pages.
Search Report dated Jun. 28, 2018, directed to GB Application No. 1721180.6; 2 pages.
Search Report dated May 30, 2018, directed to GB Application No. 1714771.1; 2 pages.
Meese-Marktscheffel et al., "Magnesium-aluminum alkoxides: the synthesis of Mg[Al(OR)4]2 (R=Busec and Ph), structure of (thf)2Mg[(μ-OPh)2Al (OPh))2]2, and dynamic NMR of Mg[Al(OBusec)4]2", Polyhedron, 1994, vol. 13, No. 6-7, pp. 1045-1050.
Office Action received for Japanese Application No. 2020-515116, dated Oct. 12, 2021, 4 pages (2 pages of English Translation and 2 pages of Original Document).
Breger et al. "High-resolution X-ray diffraction, DIFFaX, NMR and first principles study of disorder in the Li2MnO3-Li[Ni1/2Mn1/2]O2 solid solution", Journal of Solid State Chemistry 178 (2005) 2575-2585.
Jiang et al "Electrochemical and structural study of the layered, "Li-excess" lithium-ion battery electrode material Li[Li1/9Ni1/3Mn5/9]O2", Chem. Mater. 2009, 21, 2733-2745.
Office Action received for Chinese Patent Application No. 201880081413.3, dated Mar. 15, 2022, 17 pages (10 pages of English Translation and 7 pages of Original Document).
Office Action received for Japanese Patent Application No. 2020-552157, dated Jan. 25, 2022, 5 pages (2 pages of English Translation and 3 pages of Original Document).
Park et al., "The Effects of Ni Doping on the Performance of O3-Lithium Manganese Oxide Material", Korean J. Chem. Eng., vol. 21, No. 5, 2004, pp. 983-988.
Office Action received for Japanese Patent Application No. 2020-552157, dated Jun. 21, 2021, 10 pages (5 pages of English Translation and 5 pages of Original Document).
Office Action received for Japanese Patent Application No. 2020-552160, dated Jul. 5, 2021, 5 pages (2 pages of English Translation and 3 pages of Original Document).
Notification of Reason(S) for Refusal received for Korean Application No. 10-2020-7018773, dated Sep. 23, 2021, 12 pages (6 pages of English Translation and 6 pages of Original Document).
Office Action received for Japanese Patent Application No. 2020-552161, dated Sep. 7, 2021, 4 pages (2 pages of English Translation and 2 pages of Original Document).
Office Action received for Japanese Patent Application No. 2020-552159, dated Sep. 7, 2021, 4 pages (2 pages of English Translation and 2 pages of Original Document).
Office Action received for Korean Patent Application No. 10-2020-7018774, dated Sep. 23, 2021, 10 pages (5 pages of English Translation and 5 pages of Original Document).
Peretich, A.L., Amenta, D.S., Gilje, J.W. et al. "Crystal Structure of [Me2NCH(O)]2Mg[(lj-OPri)2Al(OPri)2]2". J Chem Crystallogr40, 716-719 (2010). https://doi.org/10.1007/s10870-010-9783-x.
Office Action received for Japanese Patent Application No. 2020552156 dated Sep. 7, 2021, 12 pages (6 pages of English Translation and 6 pages of Original Document).
Jang et al., Electrochemical and Solid-State Letters, 1 (1) 13-16 (1998) (Year: 1998).
Xu et al. English machine translation of CN103066274A. (Year: 2013).
Zhang et al. English machine translation of CN105047898A. (Year: 2015).
Kim et al.; "Synthesis and electrochemical behavior of Li[Li0.1Ni0.35-x/2CoxMn0.55-x/2]O2 cathode materials"; Solid State Ionics 164, pp. 43-49. (Year: 2003).
Kim et al.; ("Electrochemical properties of Li[Li(1-x)/3CoxMn(2-2x)/3]O2 (0<x<1) solid solutions prepared by poly-vinyl alcohol method"; Electrochemistry Communications 9, pp. 103-108. (Year: 2007).
Sun et al.; "The preparation and electrochemical performance of solid solutions LiCoO2-Li2MnO3 as cathode materials for lithium ion batteries"; Electrochimica Acta 51, pp. 5581-5586. (Year: 2006).
Thackeray et al. "Li2MnO3-stabilized LiMO2 (M=Mn, Ni, Co) electrodes for lithium-ion batteries"; J. of Materials Chemistry, vol. 17, No. 30, pp. 3053-3272. (Year: 2007).
Xiang et al.; "Understanding the Influence of Composition and Synthesis Temperature on Oxygen Loss, Reversible Capacity, and Electrochemical Behavior of xLi2MnO3 (1-x)LiCoO2 Cathodes in the First Cycle"; J. Phys. Chem. 118, pp. 23553-23558. (Year: 2014).
Office Action received for Japanese Patent Application No. 2020-552158, dated Aug. 10, 2022, 8 pages (3 pages of English Translation and 5 pages of Original Document).
Office Action received for Korean Patent Application No. 10-2020-7018911, dated Feb. 14, 2022, 16 pages (8 pages of English Translation and 8 pages of Original Document).
Office Action received for Korean Patent Application No. 10-2020-7018912, dated Aug. 17, 2022, 10 pages (5 pages of English Translation and 5 pages of Original Document).
Office Action received for Korean Patent Application No. 10-2020-7018912, dated Feb. 14, 2022, 16 pages (8 pages of English Translation and 8 pages of Original Document).
Lee et al., "High capacity Li[Li0.2Ni0.2Mn0.6]O2 cathode materials via a carbonate co-precipitation method," Journal of Power Sources, vol. 162, No. 2, Sep. 12, 2006, pp. 1346-1350.
Office Action received for Chinese Patent Application No. 201880081264.0, dated Feb. 7, 2022, 19 pages (11 pages of English Translation and 8 pages of Original Document).
Jiang et al., "Electrochemical and thermal studies of Li[NixLi(1/3-2x/3)Mn(2/3-x/3)]O2 (x=1/12, 1/4, 5/12, and 1/2)", Electrochemica Acta, vol. 50, 2005, pp. 4778-4783.
Lu et al. (Apr. 2002). "Synthesis, Structure, and Electrochemical Behavior of Li[Nixli(1/3-2x/3)Mn(2/3-x/3)]O2," Journal of the Electrochemical Society, 149(6): A778-A791.
Office Action received for Chinese Patent Application No. 201880081346.5, dated Jan. 27, 2022, 19 pages (11 pages of English Translation and 8 pages of Original Document).
Office Action received for Korean Patent Application No. 10-2020-7018752, dated Nov. 16, 2021, 10 pages (5 pages of English Translation and 5 pages of Original Document).
Synthesis and performance studies of lithium-rich cathode materials Li[Li(1-x)/3Ni2x/3Mn(2-x)/3]O2 and Li[Li(1-x)/3NixMn(2-2x)/3]O2, Tiantian WU, China Master's Theses Full-text Database: Engineering Technology vol. II, No. 7.
Yang et al., "Porous 0.2Li2MnO3-0.8LiNi0.5Mn0.5O2 nanorods as cathode materials for lithium-ion batteries", ESI for J. Mater. Chem. A, vol. 2, 2013, p. 5.
Zhang et al., "Synthesis and electrochemistry of layered 0.6LiNi0.5Mn0.5O2-xLi2MnO3-yLiCoO2 (x+y=0.4) cathode materials", Materials Letters, vol. 58, 2004, pp. 3197-3200.
Feng-min et al., "Recent Developments on Li-ion Batteries positive materials," Battery Bimonthly, vol. 33, No. 6, Dec. 30, 2003, 3 pages.
Hu et al., "Electric Vehicles 3rd Edition" Section 2 Power Battery, vol. 3, Jan. 31, 2003, 12 pages.
Office Action received for Chinese Patent Application No. 201880081278.2, dated Jan. 26, 2022, 18 pages (10 pages of English Translation and 8 pages of Original Document).
Second Office Action received for Chinese Patent Application No. 201880081278.2, dated Jun. 29, 2022, 20 pages (13 pages of English Translation and 7 pages of Original Document).
Third Office Action received for Chinese Patent Application No. 201880081278.2, dated Oct. 19, 2022, 14 pages (9 pages of English Translation and 5 pages of Original Document).

* cited by examiner

METHODS FOR MAKING MAGNESIUM SALTS

CROSS-REFERENCE TO RELATED APPLICATIONS

This application is a national stage application under 35 U.S.C. 371 of International Application No. PCT/GB2018/052537, filed Sep. 7, 2018, which claims the priority of United Kingdom Application No. 1714770.3, filed Sep. 14, 2017, the entire contents of each of which are incorporated herein by reference.

FIELD OF THE DISCLOSURE

The present disclosure relates to salts of magnesium. Additionally, the present disclosure relates to a method of making the magnesium salts, and the use of the magnesium salts as electrolytes in a cell or battery.

BACKGROUND OF THE DISCLOSURE

The drive to increase power densities of rechargeable batteries past those currently accessible in established lithium-ion cells for portable electronics has brought about increased interest in developing multivalent battery systems with superior theoretical energy densities. In particular, considerable research focus has been placed on magnesium-ion cells owing to the high theoretical volumetric energy density of magnesium metal anodes as well as potential safety, cost, and environmental benefits. Lithium-ion cells can also form dendrite growths, which have been found to cause short circuiting and dangerous thermal runaway. Magnesium does not readily form dendrites over multiple charge cycles. Furthermore, magnesium is highly earth-abundant and has a lower costs of production than lithium, and magnesium metal can be used directly as an anode material.

Despite being an attractive alternative to lithium-ion technology, development of magnesium-ion systems continues to be limited by a lack of electrolyte systems that are stable at both the magnesium anode and cathode materials that operate at potentials greater than 3.5 V. Many established magnesium-ion electrolyte systems gradually decompose at the electrode surfaces and result in magnesium-impermeable layers that passivate the electrodes. Additionally, many high-voltage electrolytes (stable to at least 3.4 V) are chloride-containing and are thought to result in the corrosion of common battery components such as stainless steel. Accordingly, new directions in magnesium-ion electrolyte development have focused on the synthesis and use of chloride-free salts.

SUMMARY OF THE DISCLOSURE

In some embodiments, the present disclosure provides a method of making a salt of the formula:

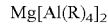

wherein R represents a compound selected from a deprotonated alcohol or thiol; an amine; or a mixture thereof; the method comprising: combining a $Mg(AlH_4)_2$ precursor with the deprotonated alcohol or thiol; or amine; or a mixture thereof to create a reaction liquor containing $Mg[Al(R)_4]_2$, and washing the reaction liquor in an organic solvent.

The term salt used throughout the specification is intended to cover complex magnesium salts that fall within the general formula given above. The choice of R group may allow for a more stable reaction mixture in the synthesis of the magnesium aluminate salt.

Previous synthetic methodologies to manufacture magnesium aluminate salts require the use of sufficiently nucleophilic reagents, thus limiting the number of candidate magnesium aluminates. However, the presently defined method allows for a broader range of reagents such that the electrochemical screening and identification of promising electrolyte candidates is not as limited.

In addition, the presently defined method relies on the use of a common $Mg(AlH_4)_2$ precursor, which can be used to synthesise a wide range of magnesium aluminate salts. The single precursor allows for rapid access to a range of relatively stable aluminate derivatives without the need to tune the reactivity of reagents or the solubility of the resulting products.

The method may comprise a further final step of filtering the washed reaction liquor under an inert atmosphere. The additional step of washing of the reaction products allows for the removal of insoluble impurities, such Aluminum-containing by-products.

The $Mg(AlH_4)_2$ precursor may be formed by a one-step ball milling process of $NaAlH_4$ and $MgCl_2$. A ball milling process is low cost and effective. A reasonable yield of the $Mg(AlH_4)_2$ precursor can be achieved via the relatively uncomplicated synthetic route.

The deprotonated alcohol or thiol; or amine may be aliphatic or aromatic. That is to say that the deprotonated alcohol or thiol; or amine may be part of a simple aromatic system, or a heterocyclic system, or be partially or fully saturated. The oxygen, nitrogen or sulphur aryl groups provide a different steric profile and electron donating ability, leading to compounds of varying stability.

The deprotonated alcohol or thiol; or amine may be fluorinated. Fluorination of the alcohol, thiol or amine increases the species reactivity and therefore increase yield of the magnesium aluminate salt and can increase the stability of the organic fragment. Based on the above, the organic moiety of the deprotonated alcohol or thiol; or amine may be based on; tert-butyl, perfluoro-tert-butyl, hexafluoro-iso-propyl, phenyl, or pentafluorophenyl.

The organic solvent may be dry DME, 2-methyl-THF, diglyme, triglyme, tetraglyme or THF. These donor solvents provide a high yield of magnesium aluminate salt. Furthermore, these solvents readily interact with the magnesium aluminate structure and can increase stability of the salt.

In some embodiments, an electrolyte comprising a salt in accordance with the above Formula (i) is included. The electrolyte may comprise the salt as an additive to a conventional electrolyte, or the salt may be used in a pure solution to form, with an appropriate solvent, an electrolyte by itself. The electrolyte may further comprises an $Mg(PF_6)_2$ additive.

In some embodiments, provided is a cell or battery comprising an electrolyte in accordance with the above Formula (i). The salts of the present disclosure do not suffer from some of the same disadvantages observed with the use of lithium salts in electrochemical cells or batteries. In addition, the salts of the present disclosure can be used in electrolytes in a number of cell or battery systems. More specifically, the cell or battery can be, for example, a lithium cell or a lithium-ion cell. However, the cell or battery using the salts of the present disclosure may be more generally described as a metal based, or a metal-ion based cell or battery. Examples of other metal or metal-ion based cells or batteries may include magnesium, calcium or aluminum metals or ions. When using the salt of the present disclosure in an electrolyte in metal cell or battery, metals such as magnesium, calcium or aluminum may be used as the metal anode without the risk of the salt decomposing.

BRIEF DESCRIPTION OF THE FIGURES

In order that the present disclosure may be more readily understood, an embodiment of the disclosure will now be described, by way of example, with reference to the accompanying Figures, in which.

DETAILED DESCRIPTION OF THE DISCLOSURE

The present disclosure will now be illustrated with reference to the following examples.

Example 1—Synthesis of $Mg(AlH_4)_2$ Precursor

A mixture of sodium aluminum hydride from Acros Organics and magnesium chloride from Alfa Aesar in a ratio of 2:1 was ball-milled for an hour to produce a mixture of magnesium aluminum hydride and sodium chloride, containing a theoretical 42.5 wt % of magnesium aluminum hydride (scheme below).

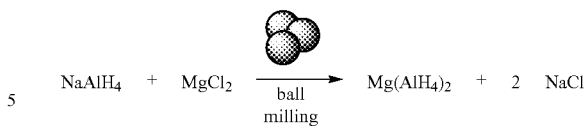

The resulting magnesium aluminum hydride mixture offers a general platform for the synthesis of magnesium aluminates, as will be shown by the following examples.

Example 2—Synthesis of Magnesium Aluminates Using Alcohol

Magnesium aluminates were synthesized by treating magnesium aluminum hydride with various fluorinated/non-fluorinated alkyl and aryl alcohols in dry THF or DME (Scheme below).

These reactions were followed by filtration under inert atmosphere to remove insoluble impurities (i.e. sodium chloride and aluminum-containing by-products). The resulting magnesium aluminates were retrieved, typically as THF or DME solvates, in moderate to high yields (77-94%). The particular alcohols that were used in the synthesis were (1) tert-butanol (Sigma-Aldrich); (2) perfluoro-tert-butanol (Alfa Aesar); (3) hexafluoro-iso-propanol (Fluorochem); (4) phenol (Sigma-Aldrich); (5) pentafluorophenol (Fluorochem).

Example 3—Use of Magnesium Aluminates as an Electrolyte Salt

All cyclic voltammetry (CV) and linear sweep voltammetry (LSV) experiments reported below were performed in a glovebox (MBraun) under an atmosphere of dry argon using dry solvents. Cyclic voltammetry and linear sweep voltammetry were performed using an IVIUM CompactStat.

Figure 1:
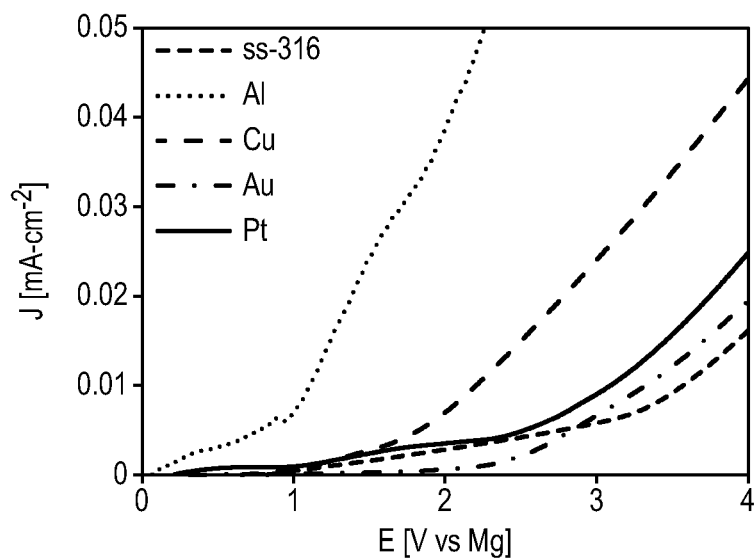
FIG. 1 is a linear sweep voltammetry plot of a 0.25 M solution of magnesium tert-butoxyaluminate (1) in THF on stainless steel (ss-316), aluminum, copper, gold, and platinum electrodes, according to some embodiments.

A solution of each of the magnesium aluminates (1)-(5) in dry organic solvent was prepared at a concentration of 0.25 M. A solution of magnesium tert-butoxyaluminate (1) in THF was found to exhibit poor oxidative stability on stainless steel (ss-316), aluminum, copper, gold, and platinum electrodes, with the onset of oxidation occurring at around 1 V vs magnesium on each electrode, as shown in FIG. 1.

Figure 2:
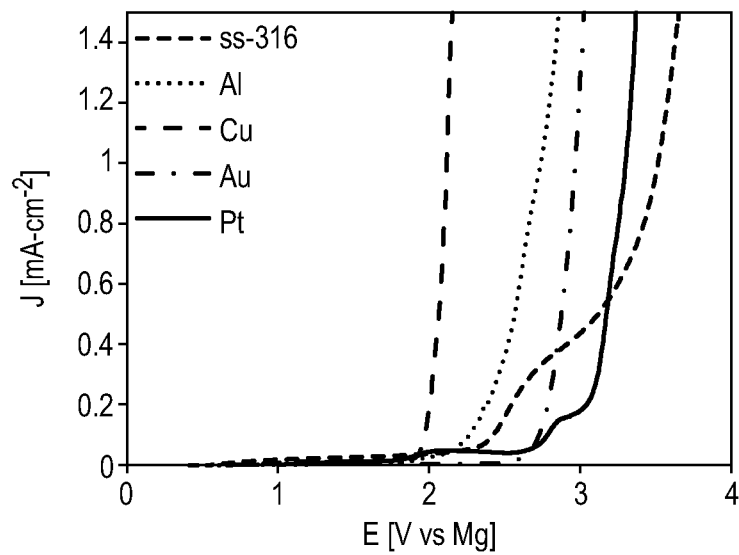
FIG. 2 is a linear sweep voltammetry plot of a 0.25 M solution of magnesium perfluoro-tert-butoxyaluminate (2) in DME on stainless steel (ss-316), aluminum, copper, gold, and platinum electrodes, according to some embodiments.

In contrast to magnesium tertbutoxyaluminate (1), magnesium aluminates 2-5 are soluble in DME. The solution of magnesium perfluoro-tert-butoxyaluminate (2) in DME exhibits an extended stability window on the five electrodes tested above, exhibiting onsets of oxidation between 1.9 V (copper) and 2.6 V (platinum) vs magnesium, as shown in FIG. 2. The LSV of aluminate (2) in DME on platinum exhibited a minor anodic process beginning at approximately 1.8 V vs magnesium. Without wishing to be bound by theory, this can be attributed to platinum-catalyzed decomposition of small amounts of residual alcohol starting material.

Figure 3:
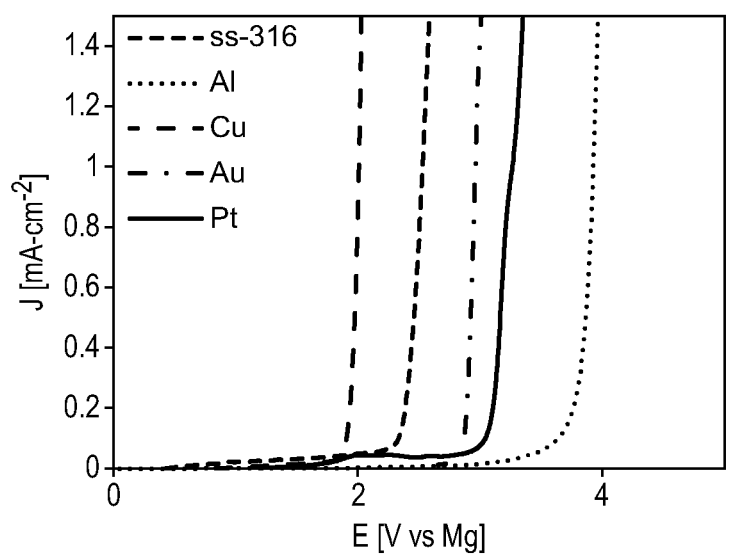
FIG. 3 is a linear sweep voltammetry plot of a 0.25 M solution of magnesium hexafluoro-iso-propoxyaluminate (3) in DME on stainless steel (ss-316), aluminum, copper, gold, and platinum electrodes, according to some embodiments.

A 0.25 M solution of magnesium hexafluoro-iso-propoxyaluminate (3) made by the presently claimed method exhibits an onset of oxidation of around 2.2 V, 2.5 V, and 2.9 V vs magnesium on copper, aluminum, and gold, respectively, as shown in FIG. 3. On platinum and stainless steel, minor anodic processes are observed to begin around 1.5 V and 1.8 V vs magnesium, respectively, with more significant processes beginning around 2.8 to 3 V vs magnesium on both electrodes. As these onsets of oxidation are typically lower than the previously reported values, it is possible that the two electrolyte preparation methods result in different impurities or by-products (i.e. chlorides or Mg alkoxides) that enhance or limit the stability of the solution, and/or passivate the current collectors.

Figure 4:
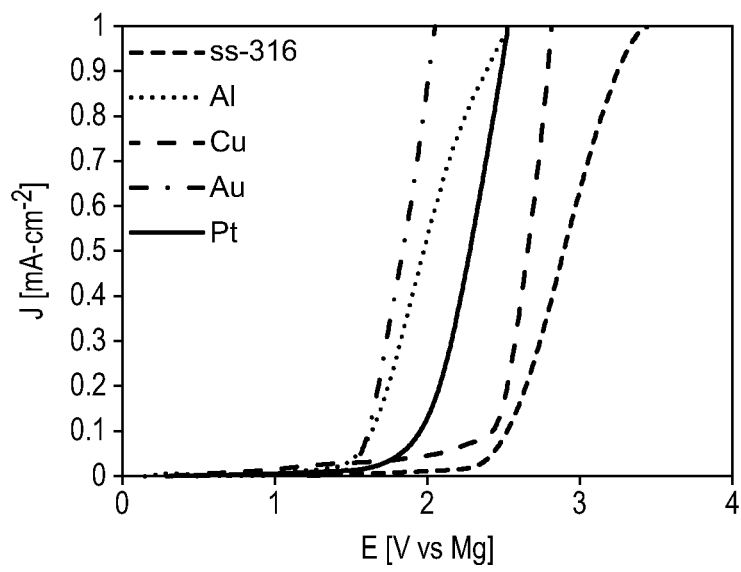
FIG. 4 is a linear sweep voltammetry plot of a 0.25 M solution of magnesium phenoxyaluminate (4) in DME on stainless steel (ss-316), aluminum, copper, gold, and platinum electrodes, according to some embodiments.

A solution of magnesium phenoxyaluminate (4) in DME exhibits moderate oxidative stability with the electrodes that were tested, showing onsets of oxidation between 1.5 V (aluminum, gold and platinum) and 2.2 V ss-316 vs magnesium, as shown in FIG. 4. A minor anodic process beginning around 1 V vs magnesium is observed on copper, followed by a larger process at approximately 2.3 V vs magnesium.

Figure 5:
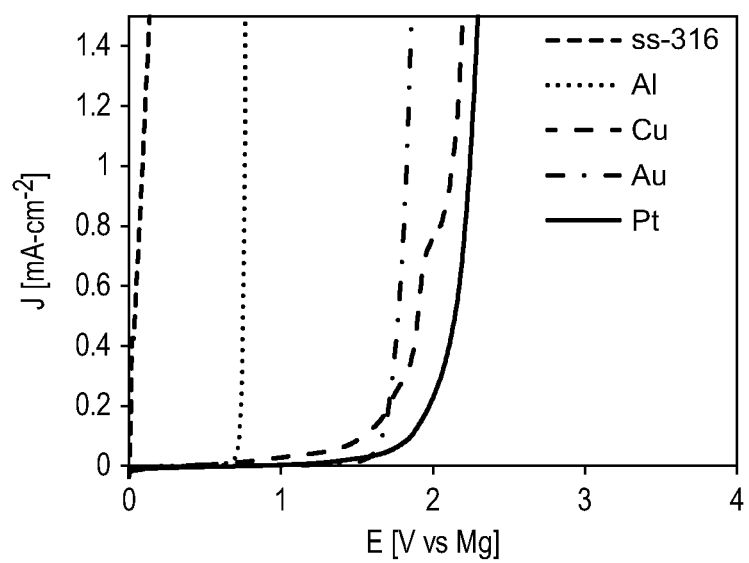
FIG. 5 is a linear sweep voltammetry plot of a 0.25 M solution of magnesium perfluorophenoxyaluminate (5) in DME on stainless steel (ss-316), aluminum, copper, gold, and platinum electrodes, according to some embodiments.

The solution of magnesium perfluorophenoxyaluminate (5) in DME exhibits an onset of oxidation below 2 V vs magnesium on all electrodes tested, with ss-316 and aluminum exhibiting the lowest onset, as shown in FIG. 5.

CV was used to examine the ability of these 0.25 M magnesium aluminate solutions to facilitate magnesium plating and stripping using a platinum working electrode.

CV measurements of magnesium aluminate (1) in THF as well as magnesium aluminates (3) and (5) in DME did not show evidence of magnesium plating/stripping behaviour between −0.5 V and 1 V vs Mg.

Figure 6:
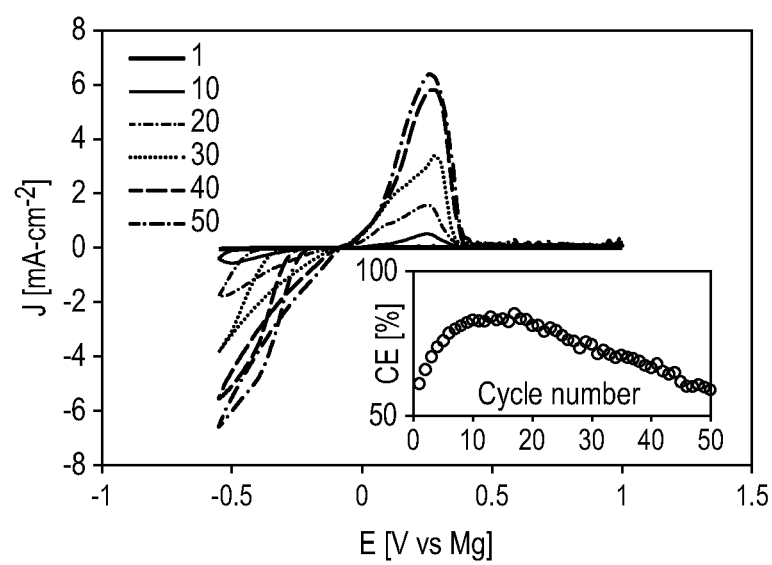
FIG. 6 is a cyclic voltammogram and a columbic efficiency plot of a 0.25 M solution of magnesium perfluoro-tert-butoxyaluminate (2) in DME cycling at a rate of 10 $mVs^{-1}$ over 50 cycles on a platinum working electrode, according to some embodiments.

CV of magnesium aluminate (2) in DME shows that this solution facilitates plating and stripping of magnesium using a platinum working electrode over fifty cycles between −0.55 V and 1 V vs magnesium, as shown in FIG. 6. Plating overpotentials decrease over the 50 cycles from approximately −0.45 to −0.15 V vs magnesium. However, Coulombic efficiencies (CE) of the plating-stripping process peak at around 85% around cycle 15 and drops to 60% through cycle 50. This gradual decrease in CE suggests that the electrolyte decomposes during cycling and partially passivates the electrodes.

Figure 7:
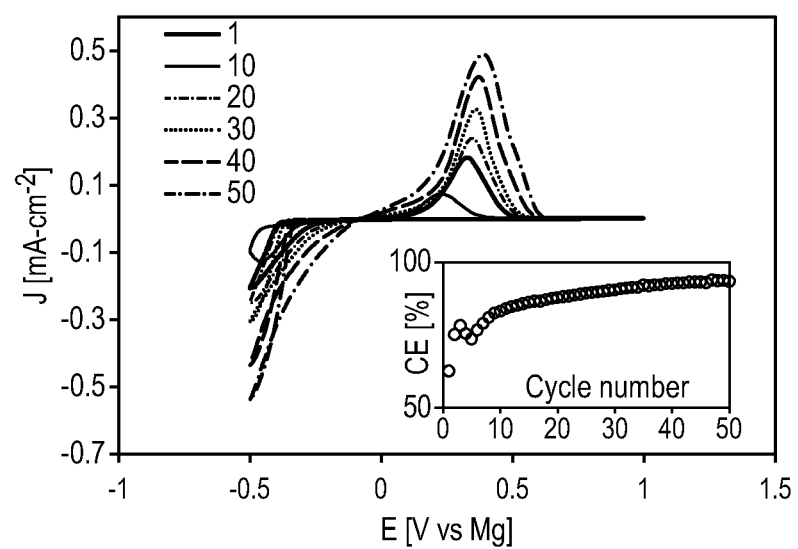
FIG. 7 is a cyclic voltammogram and a columbic efficiency plot of a 0.25 M solution of magnesium phenoxyaluminate (4) in DME cycling at a rate of 10 $mVs^{-1}$ over 50 cycles on a platinum working electrode, according to some embodiments.
Figure 8A:
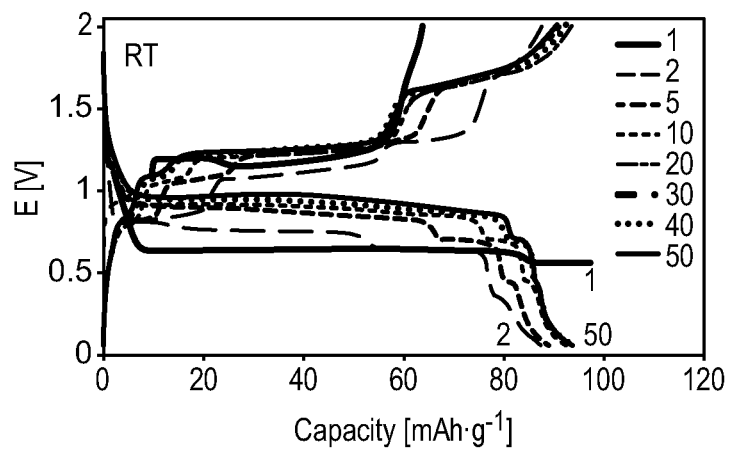
FIGS. 8A-8H show the charge-discharge behaviour of magnesium full cells containing Chevrel phase cathodes and magnesium anodes and 0.25 M solutions of magnesium aluminates (2) [a) and b)], (3) [c) and d)], (4) [e) and f)], and (5) [g) and h)] in DME at room temperature (rate: C/25) and 55° C. (rate: C/10), according to some embodiments.
Figure 8B:
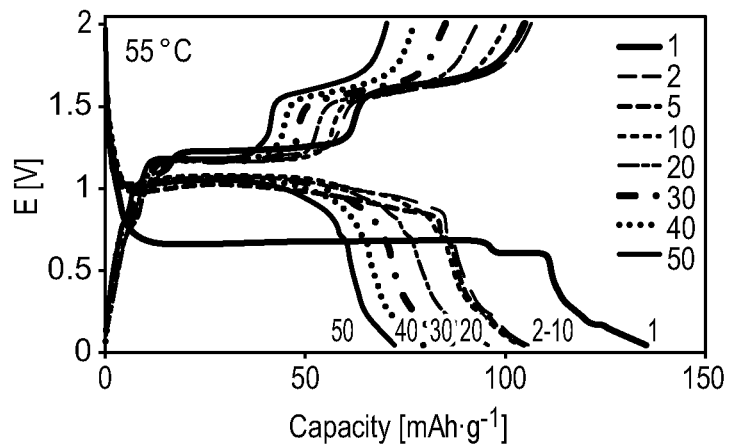
Figure 8C:
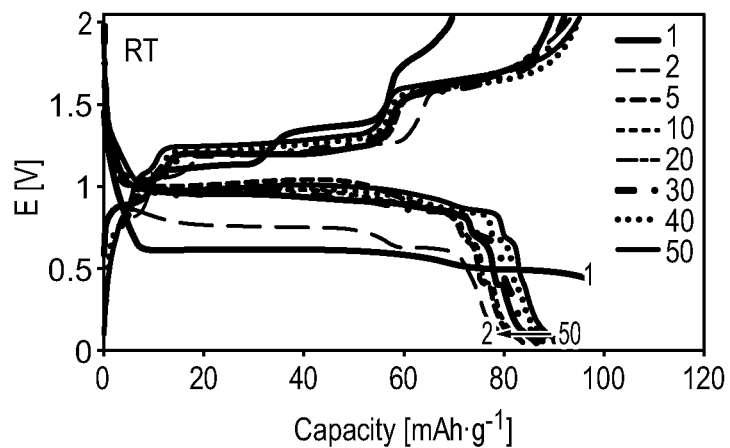
Figure 8D:
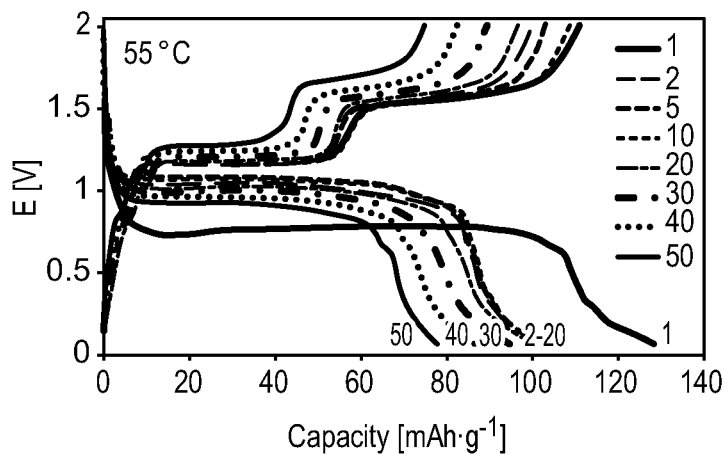
Figure 8E:
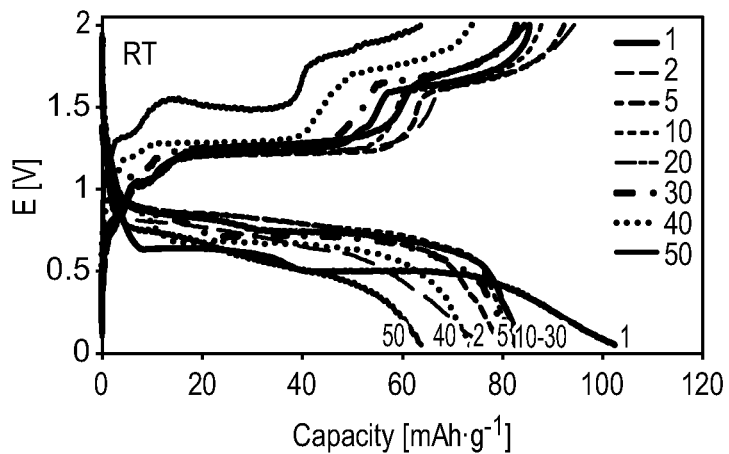
Figure 8F:
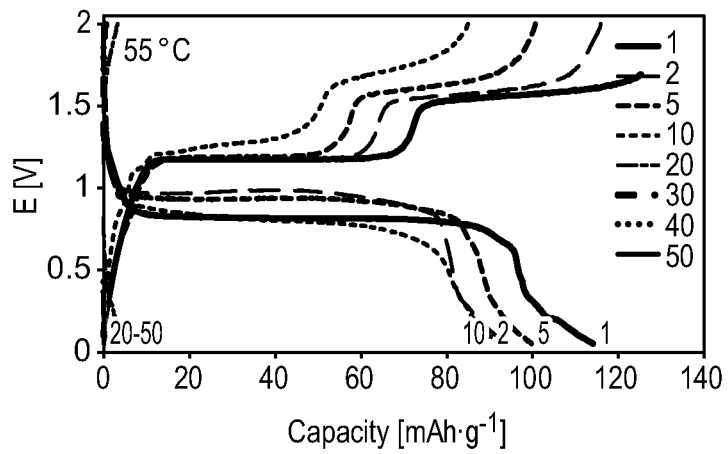
Figure 8G:
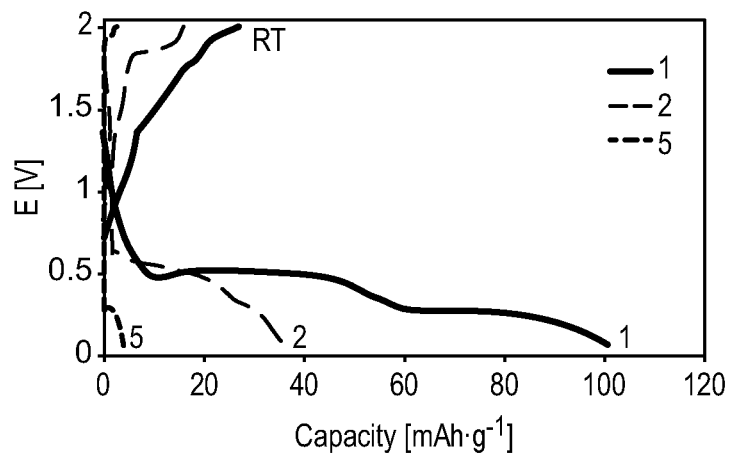
Figure 8H:
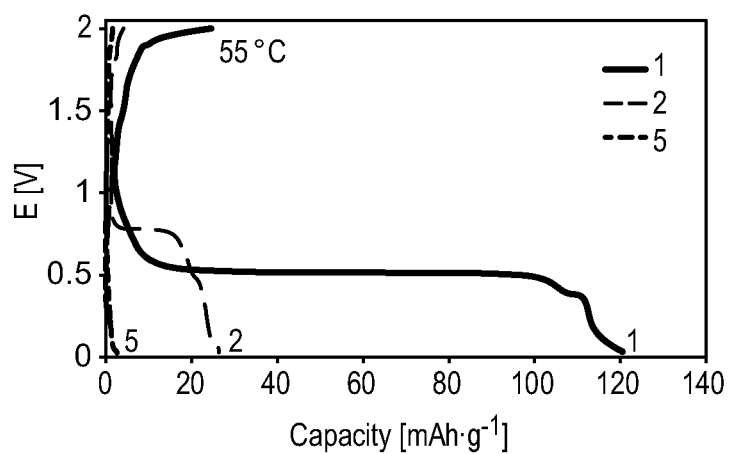

CV of magnesium aluminate (4) in DME shows clear plating and stripping behaviour on platinum between −0.5 V and 1 V vs magnesium over 50 voltammetric cycles, as shown in FIG. 7. Again, plating overpotentials are observed to decrease from −0.41 V to −0.29 V vs magnesium over the 50 cycles. The CEs of magnesium plating and stripping facilitated by magnesium aluminate (4) increase over the 50 cycles to roughly 95%.

The electrochemical behaviour of 0.25 M DME solutions of magnesium aluminates (2)-(5) was further examined in magnesium full cells constructed using Chevrel phase (Mo6S8) cathodes, magnesium ribbon anodes, and stainless steel current collectors both at room temperature and 55° C.

Generally, the magnesium aluminate electrolytes exhibited better reversibility, maintained higher capacities over more charge-discharge cycles, and could be cycled at higher rates at 55° C. than at room temperature, as shown in FIG. 8. At room temperature, full cells containing magnesium aluminates (2)-(4) typically reached a maximum gravimetric capacity of around 80 mAh·g-1 (FIGS. 8A, 8C, and 8E). However, at 55° C., full cells containing the same electrolytes maintained gravimetric capacities at around 100 mAh·g-1 over 10 charge-discharge cycles with small to moderate overpotentials (FIGS. 8B, 8D, and 8F).

Full cells containing magnesium aluminate (5) exhibited very poor charge-discharge behaviour and significant capacity fade within five cycles at room temperature and 55° C. The full cell performance of magnesium aluminate (5) in DME is consistent with its apparent instability as observed by LSV measurements. Without wishing to be bound by theory, the low stability of the magnesium pentafluorophenyl aluminate (5) may result from the stability of the pentafluorophenoxy anion, which could render it more labile and more easily removed from aluminum.

The invention claimed is:

1. A method of making an electrolyte, the method comprising:
    forming a $Mg[AlH_4]_2$ precursor by a one-step ball milling process of $NaAlH_4$ and MgCl;
    combining the $Mg[AlH_4]_2$ precursor with a deprotonated alcohol, thiol, amine, or a mixture thereof to create a reaction liquor containing $Mg[Al(R)_4]_2$, wherein R represents the deprotonated alcohol, thiol, amine, or the mixture thereof;
    washing the reaction liquor in an organic solvent selected from the group consisting of dry DME, 2-methyl-THF, diglyme, triglyme, and tetraglyme to obtain a salt; and
    combining the salt with an $Mg(PF_6)_2$ additive.

2. The method of claim 1, comprising filtering the washed reaction liquor under an inert atmosphere.

3. The method of claim 1, wherein at least one of the deprotonated alcohol, thiol, amine, or mixture thereof is aromatic.

4. The method of claim 1, wherein the deprotonated alcohol, thiol, amine, or mixture thereof is fluorinated.

5. The method of claim 1, wherein an organic moiety of at least one of the deprotonated alcohol, thiol, amine, or a mixture thereof comprises tert-butyl, perfluoro-tert-butyl, hexafluoro-iso-propyl, phenyl, or pentafluorophenyl.

* * * * *